United States Patent
Ellegaard et al.

(10) Patent No.: US 10,314,246 B2
(45) Date of Patent: Jun. 11, 2019

(54) METHOD OF MANUFACTURING A PLANT RECEPTACLE AS WELL AS A PLANT RECEPTACLE

(71) Applicant: Ellegaard Holdings A/S, Esbjerg O (DK)

(72) Inventors: Merethe Ellegaard, Esbjerg (DK); Carsten Kulmbach, Ribe (DK)

(73) Assignee: ELLEGAARD HOLDINGS A/S, Esbjerg O (DK)

( * ) Notice: Subject to any disclaimer, the term of this patent is extended or adjusted under 35 U.S.C. 154(b) by 465 days.

(21) Appl. No.: 14/402,626

(22) PCT Filed: May 22, 2013

(86) PCT No.: PCT/DK2013/050156
§ 371 (c)(1),
(2) Date: Nov. 20, 2014

(87) PCT Pub. No.: WO2013/174386
PCT Pub. Date: Nov. 28, 2013

(65) Prior Publication Data
US 2015/0135589 A1   May 21, 2015

(30) Foreign Application Priority Data
May 22, 2012   (DK) .................. 2012 70270

(51) Int. Cl.
*A01G 9/02* (2018.01)
*B32B 37/14* (2006.01)
(Continued)

(52) U.S. Cl.
CPC .......... *A01G 9/021* (2013.01); *A01G 9/0291* (2018.02); *B32B 37/144* (2013.01);
(Continued)

(58) Field of Classification Search
CPC . A01G 9/102; A01G 9/02; A01G 9/10; A01G 9/1006; A01G 9/1026; A01G 9/08;
(Continued)

(56) References Cited

U.S. PATENT DOCUMENTS

| 4,369,599 A | * | 1/1983 | Franclet ................. A01G 9/104 111/100 |
| 6,177,193 B1 | * | 1/2001 | Tsai .......................... D01F 8/14 428/373 |

(Continued)

FOREIGN PATENT DOCUMENTS

| DE | 34 00 696 A1 | 7/1985 |
| DE | 102010026532 A1 | 1/2012 |

(Continued)

OTHER PUBLICATIONS

Machine translation of JP 05039412 to Hashimoto et al., dated Feb. 1993.*

(Continued)

*Primary Examiner* — Kathleen I Alker
(74) *Attorney, Agent, or Firm* — Berg Hill Greenleaf Ruscitti, LLP.

(57) ABSTRACT

Method of manufacturing a plant receptacle wherein the following steps are performed: a) a PLA thread is co-extruded with a flexible aliphatic polyester, said flexible aliphatic polyester comprising 10 wt % to 30 wt % bamboo material, such that the flexible aliphatic polyester covers the PLA thread, thereby creating a weldable biodegradable thread; b) using said weldable biodegradable thread in a woven or non-woven process, making a permeable sheet material; c) continuously forming said sheet material into a continuous receptacle, by bringing the side edges of said sheet material into contact and welding said side edges (Continued)

together; d) cutting said continuous receptacle in predetermined lengths thereby creating separate plant receptacles.

7 Claims, 3 Drawing Sheets

(51) Int. Cl.
- *B32B 38/00* (2006.01)
- *B32B 38/04* (2006.01)
- *A01G 9/029* (2018.01)

(52) U.S. Cl.
CPC .......... *B32B 38/0004* (2013.01); *B32B 38/04* (2013.01); *B32B 2038/047* (2013.01); *Y10T 156/1052* (2015.01); *Y10T 156/1057* (2015.01)

(58) Field of Classification Search
CPC ...... A01G 9/081; A01G 9/0291; D04H 1/435; D04H 1/485; D04H 1/541; D04H 3/011; D04H 3/07; D04H 3/073; D04H 3/077; D04H 3/10; D04H 3/14; D04H 3/147; D04H 3/153; D04H 5/00; B01D 2239/0636; B01D 2239/064; B32B 37/144; B32B 38/0004; B32B 38/04
See application file for complete search history.

(56) References Cited

U.S. PATENT DOCUMENTS

| | | | |
|---|---|---|---|
| 6,195,938 B1 | 3/2001 | Chee | |
| 6,399,197 B1 * | 6/2002 | Kanamori | D01F 6/92 428/378 |
| 7,790,640 B2 * | 9/2010 | Chakravarty | A61F 13/15252 442/327 |
| 2008/0200890 A1 * | 8/2008 | Wood | A01N 25/10 604/360 |
| 2009/0068463 A1 * | 3/2009 | Mochizuki | D01F 8/12 428/370 |
| 2009/0081396 A1 * | 3/2009 | Hokari | B32B 27/08 428/35.7 |
| 2010/0304066 A1 * | 12/2010 | Matsunaga | D04H 3/011 428/36.1 |
| 2012/0064791 A1 * | 3/2012 | Matsumura | D04H 1/435 442/402 |

FOREIGN PATENT DOCUMENTS

| | | | | |
|---|---|---|---|---|
| EP | 0512272 A1 | | 11/1992 | |
| EP | 1054085 A1 | * | 11/2000 | ............... D01F 6/92 |
| EP | 1129612 A2 | | 9/2001 | |
| EP | 1541345 A1 | | 6/2005 | |
| JP | 05039412 | * | 2/1993 | |
| JP | 2000 342077 A | | 12/2000 | |
| JP | 2001040529 A | * | 2/2001 | ............... D01F 6/92 |
| JP | 2005068840 | * | 3/2005 | ............... E04F 15/02 |
| JP | 3701539 B2 | * | 9/2005 | ............ A01K 91/00 |
| JP | 2007084988 | * | 4/2007 | |
| JP | 2011038219 | * | 2/2011 | |

OTHER PUBLICATIONS

International Preliminary Report on Patentability and Written Opinion for International (PCT) Patent Application No. PCT/DK2013/050156, dated Nov. 25, 2014, 6 pages.

International Search Report prepared by the European Patent Office dated Aug. 23, 2013, for International Application No. PCT/DK2013/050156.

Search Report prepared by the Danish Patent Office dated Dec. 7, 2012, for Danish Patent Application No. PA 2012 70270.

* cited by examiner

METHOD OF MANUFACTURING A PLANT RECEPTACLE AS WELL AS A PLANT RECEPTACLE

CROSS REFERENCE TO RELATED APPLICATIONS

This application is a national stage application under 35 U.S.C. 371 and claims the benefit of PCT Application No. PCT/DK2013/050156 having an international filing date of May 22, 2013, which designated the United States, which PCT application claimed the benefit of Danish Patent Application No. PA 2012 70270 filed May 22, 2012, the disclosure of each of which are incorporated herein by reference.

FIELD OF THE INVENTION

The present invention relates to a method of manufacturing a plant receptacle comprising a number of steps as well as a plant receptacle manufactured by said process.

BACKGROUND OF THE INVENTION

For the propagation of plants either starting from seeds or from cuttings it is well-known in the art to use small pots, for example pots made from plastic or polymer netting or sphagnum where growth media as well as the seed or cutting are placed inside the growth media in the pot.

These pots are traditionally made in a very large number where the pots have to fulfil certain requirements relating to its ability to drain off excess water, to allow air, especially oxygen, into the growth media and thereby stimulate the propagation of roots and thereby growth of the entire plant. The pots have to be cheap, relatively easy to handle and at the same time preferably biodegradable. At the same time it is desirable that the pot has further abilities for example being able to maintain the growth media in a stable and secure manner, even during handling and overall stimulating the propagation of the plants starting from the seeds or cuttings.

In the terminology of the present invention cutting shall be understood as pieces of plant tissue which is cut off other plants and placed in the growth media in order to grow to be new plants.

OBJECT OF THE INVENTION

The present invention is directed to a novel and inventive method of manufacturing such a type of plant receptacle where the receptacle comprises further advantageous features as compared to the prior art.

DESCRIPTION OF THE INVENTION

The present invention consequently presents a method of manufacturing a plant receptacle wherein the following steps are performed:
a) a PLA thread is covered with a flexible aliphatic polyester, said flexible aliphatic polyester comprising 10 wt % to 90 wt % organic material, such that the flexible aliphatic polyester covers the PLA thread, thereby creating a weldable biodegradable thread;
b) using said weldable biodegradable thread in a woven or non-woven process, making a permeable sheet material;
c) continuously forming said sheet material into a continuous receptacle, by bringing the side edges of said sheet material into contact and welding said side edges together;
d) cutting said continuous receptacle in predetermined lengths thereby creating separate plant receptacles or wherein said continuous receptacle is perforated substantially perpendicular to the longitudinal direction of the continuous receptacle at predetermined intervals, thereby allowing separate plant receptacles to be detached from the continuous receptacle.

The invention additionally presents a further method of manufacturing a plant receptacle wherein the following steps are performed:
a) A mix of fibres containing a first type of fibre in an amount from 25% to 75% of a monofilament PLA based fibre and a second type of fibre in an amount from 25% to 75% of a fibre made from a PLA thread covered with a flexible aliphatic polyester, said flexible aliphatic polyester comprising 10 wt % to 90 wt % organic material, such that the flexible aliphatic polyester covers the PLA thread, thereby creating a weldable biodegradable thread, said first and second types of fibres adding up to 100% of the mix;
b) using said mix of fibres in a woven or non-woven process, making a permeable sheet material;
c) continuously forming said sheet material into a continuous receptacle, by bringing the side edges of said sheet material into contact and welding said side edges together;
d) cutting said continuous receptacle in predetermined lengths thereby creating separate plant receptacles or wherein said continuous receptacle is perforated substantially perpendicular to the longitudinal direction of the continuous receptacle at predetermined intervals, thereby allowing separate plant receptacles to be detached from the continuous receptacle.

Extensive testing has shown that the addition of an organic material such as for example bamboo material incorporated into the material from which the plant receptacle is manufactured provides a number of advantages. Firstly, the bamboo content acts as a fungicide, i.e. it will hinder the growth of fungus on the plant receptacle as such, but also in the growth media placed inside the plant receptacle. This is a very important aspect as fungus is a very aggressive organism which will deplete the growth media of important nutrients, moisture and oxygen which would otherwise stimulate the growth of the plant placed inside the plant receptacle.

In a further advantageous embodiment of the invention the organic material is selected between or is a mixture of bamboo, soya, coconut, flax, and/or banana, where the organic material is added to the aliphatic polyester in liquid, pulverised or granular form.

Bamboo is the preferred organic material as it exhibits excellent characteristics with respect to welding and fungicidal effects. From the banana types, especially material from the species Abaca is preferred. Flax is commonly occurring.

Flax (also known as common flax or linseed) (binomial name: *Linum usitatissimum*) is a member of the genus *Linum* in the family Linaceae. It is native to the region extending from the eastern Mediterranean to India and was probably first domesticated in the Fertile Crescent.

Abacá (*Musa textilis*), Musa textilis, is a species of banana native to the Philippines, grown as a commercial crop in the Philippines, Ecuador, and Costa Rica. The plant is harvested for its fibre, once generally called Manila Hemp, extracted from the trunk or pseudostem. The fiber was originally used for making twines and ropes; now most abacá is pulped and used in a variety of specialized paper products including tea bags, filter paper and banknotes. It is classified as a hard fiber, along with coir, henequin and sisal—all of which are also useful within the present invention.

Traditionally, plant receptacles or pots used for this purpose in the prior art are coated or treated with a fungicide in order to avoid the propagation of fungus, but the fungicide treatment is prohibited in a number of jurisdictions, and furthermore the use of fungicides is an extra pollutant and thereby a hazard to the environment. Also, treatment with a fungicide is an extra cost in the manufacture of a low cost product and therefore also influential on the competitive edge of the product as such. It is therefore advantageous to be able to add a built-in natural fungicide which has no hazardous side effects and which is not listed as a fungicide and therefore is not ruled illegal in a number of jurisdictions and at the same time is a relatively cheap addition to the material from which the plant receptacle is made.

Furthermore, by using a PLA or polylactide based polyester manufactured from a lactic acid, the base material is biologically degradable in an industrialized composting process (mulching plant). The flexible aliphatic polyester comprising 10 wt % to 30 wt % organic material is a modified aliphatic polyester, which in addition to being biodegradable also have further advantageous characteristics, which will be elaborated below. A preferred flexible aliphatic polyester is available under the trade name GS Pla®, which is a registered trademark and covers a whole group of materials, where the GS Pla stands for Green Sustainable Plastics, the GS Pla obtainable from e.g. the Mitsubishi Chemical Corporation is composed mainly of succinic acid and 1,4-butanediol thereby making the GS Pla, a flexible aliphatic polyester with properties similar to those of polyolefin.

PLA in itself is not weldable, but when the PLA is covered by a flexible aliphatic polyester also when comprising 10 wt % to 30 wt % organic material as described above it is possible to create bonding between fibres in a heat sealing process. Therefore, by using a PLA thread which is co-extruded with a flexible aliphatic polyester comprising 10 wt % to 30 wt % organic material a weldable, biodegradable thread is created which when formed into a permeable sheet material may be heat sealed together along the edges thereby creating the plant receptacle. The co-extrusion process is generally known as a bico process creating a bicomponent fibre.

Therefore, the combination of characteristics of the materials creates the best of both worlds, i.e. a non-hazardous, non-polluting, biodegradable sheet material which according to tests carried out has a substantially higher (20-40%) permeability for air and moisture compared to other similar products, which stimulates plant growth and at the same time a very simple, fast and inexpensive process, namely heat sealing, may be used in order to manufacture the plant receptacles. The organic, especially bamboo content ensures a fungicidal effect such that the excellent properties of the material may be maintained over time until it is desirable to compost the plant receptacle.

In order to manufacture the flexible aliphatic polyester covered PLA material it is preferred to co-extrude the flexible aliphatic polyester and the PLA tread, and thereafter introduce these very thin treads into a spunwoven process. Other methods for creating a web from the PLA thread covered with a flexible aliphatic polyester, comprising 10 wt % to 30 wt % organic material may also be used, such as for example thermo-bonding, hydro-entanglement, needle-punching or chemical bonding.

In a further advantageous embodiment of the invention the method is further completed by introducing between steps c) and d) a further method step c1) wherein the formed continuous receptacle is filled with a growth medium either during or after forming of the plant receptacle, thereby creating a pre-filled plant receptacle. In this manner the manufacturing process creates a completely finished and ready-to-use plant receptacle already filled with a growth medium. Typically, growth media will be selected according to the seeds or cuttings which need to be propagated, and typically the growth media will be some type of sphagnum optionally modified with various nutrients, fertilizers etc.

In a still further advantageous embodiment a further step is introduced before step c1) or d) in that a pair of welding cams creates a weld across the cylinder substantially perpendicular to the longitudinal direction of the cylinder.

By introducing the welding cams and thereby utilizing the unique welding/heat-sealing capabilities of the material, the receptacles may be provided with a bottom such that it is avoided that any growth media material either during handling, seeding or otherwise will fall out of the bottom of the plant receptacle. A further advantageous embodiment comprises replacing step d by a step d1 wherein said continuous receptacle is perforated substantially perpendicular to the longitudinal direction of the continuous receptacle at predetermined intervals, thereby allowing separate plant receptacles to be detached from the continuous receptacle. In this manner it is possible to make a substantially endless string of plant receptacles connected by perforations which may easily be detached before use.

Where it is not desirable to have cylindrically shaped plant receptacles the sheet material during the process may be formed and welded around a conical former thereby creating conical plant receptacles. It is obvious that even without a bottom the growth media placed in these types of conical plant receptacles will create resistance against allowing the growth media to empty out of the bottom due to the conical shape of the receptacle.

The invention is also directed to a plant receptacle manufactured according to the method as described above where said plant receptacle has a wall made from a spun-woven weldable material, which material is made from a PLA thread covered by a layer of flexible aliphatic polyester comprising 10 wt % to 30 wt % organic material.

The organic material may be in the shape of liquid, fibres, powder, granules or any other suitable form, with respect to the manufacturing process. Many of the fibres is produced in pulp form, and may be added starting from this basis.

Further advantages of the plant receptacle are listed in the dependent claims.

DESCRIPTION OF THE DRAWING

The invention will now be explained with reference to the accompanying drawing wherein FIG. 1 schematically illustrates the inventive method of manufacturing a plant receptacle FIG. 2 schematically illustrates a further embodiment of the inventive method of manufacturing a plant receptacle FIG. 3 schematically illustrates a plant receptacle and a cutting or seed FIG. 4 schematically illustrates a further embodiment of the inventive method of manufacturing a plant receptacle

DETAILED DESCRIPTION OF THE INVENTION

Figure 1:
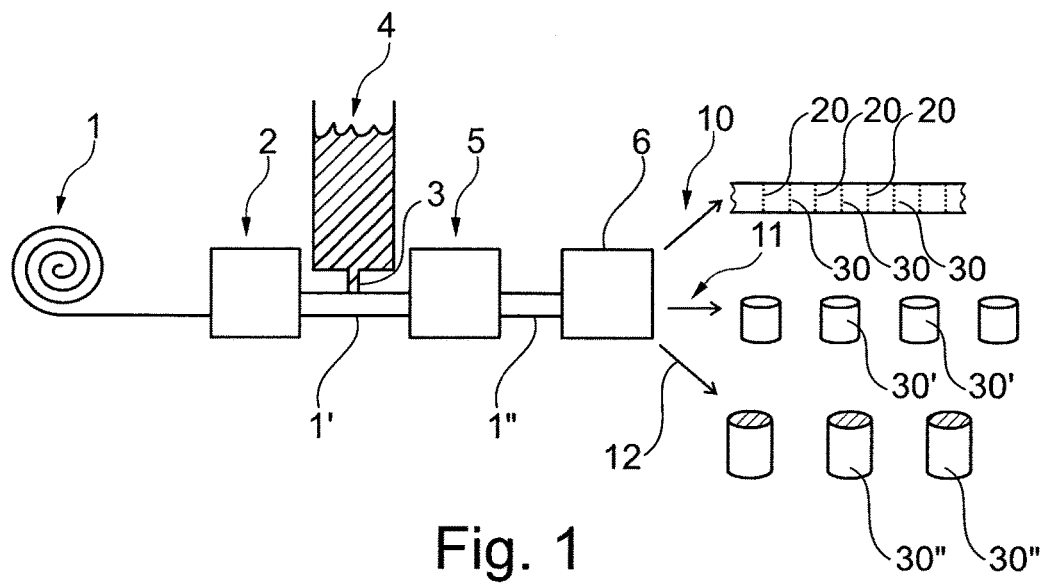

In FIG. 1 is schematically illustrated the inventive method of manufacturing a plant receptacle. A web 1 manufactured by co-extruding a PLA thread with a flexible aliphatic polyester containing 10-90 weight percent bamboo material is being fed into a former 2. In the illustrated schematic embodiment the former 2 shapes the relative flat web into a long cylinder having an open slit facing upwards. A funnel 3 is introduced into this slit where the funnel 3 is connected to a reservoir 4 such that growth media from the reservoir 4 may be introduced into the cylindrically formed web 1'.

After this the cylinder 1' filled with growth media 4 is introduced into a welding machine 5 where the two opposing sides of the web are overlapped and exposed to heating such that two sides will weld together and form what in cross-section will be a closed cylinder. As the closed cylinder 1" leaves the welding machine 5 it is introduced into the last process stage 6. This process stage may carry out either one of the following routines as indicated by the arrows 10, 11 and 12. If the process stage 6 is provided with a perforating tool, the cylinder 1" will be provided with perforations 20 across the cylinder thereby making it easy to separate single plant receptacles 30 simply by tearing them apart at the perforated lines 20.

In order for the web to be able to withstand the handling, treatment etc. it is necessary to provide a certain strength in the web. For these purposes the web shall be able to withstand tension in the longitudinal direction of the web of from 35-55 N with a maximum elongation of 2-10% (which for typical receptacles correspond to between 2 mm and 15 mm). Transversely the web shall withstand a tension of 10-30 N, with an elongation between 2 and 15% (corresponding to a typical elongation of a receptacle between 5 and 15 mm). All values listed as until/before breakage.

The material thickness shall correspond to between 10-50 grams per square meter, providing the desired characteristics as discussed above.

According to the invention it is optional to have the growth media filling station 3, 4, and in embodiments where the cylinder 1" is not filled with growth media the process step 6 may simply cut the cylindrical web into separate empty plant receptacles 30'. In embodiments, however, where the formed web 1' is filled with growth media by the growth media filling station 3, 4 the cutter will cut as indicated by the arrow 12, the filled cylinder 1" into separate plant receptacles 30" which are each filled with growth media.

Figure 2:
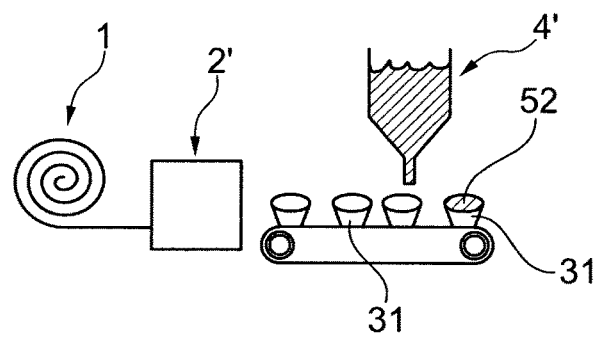
Figure 3:
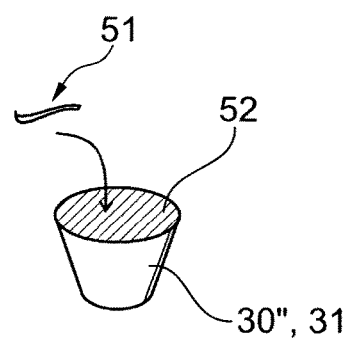

In FIG. 2 is illustrated a method where the web material 1 is introduced into a former 2' which former 2' shapes the web material into conical plant receptacles 31. As they leave the former 2', they may pass a filling station 4' which will introduce growth media into the plant receptacle 31. At this stage a seed or plant cutting 51 may be inserted into the growth media 52 as illustrated in FIG. 3.

Figure 4:
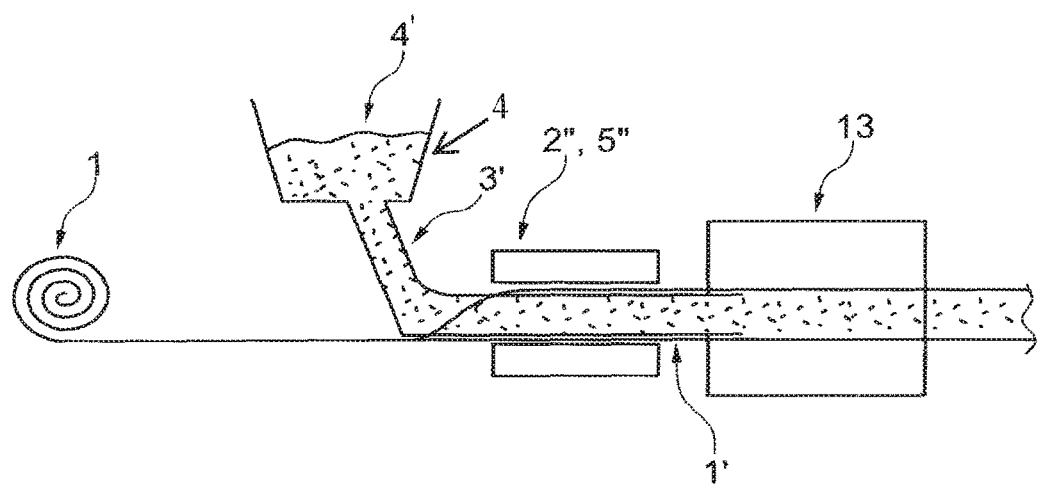

In FIG. 4 is illustrated a further manufacturing process. The web material 1 is supplied on a roll. The material 1 is fed into a combined former and welding station 2", 5", where a cylinder is shaped around the filling tube 3', connected to a reservoir 4 of growth medium 4'. The web cylinder 1' continues into a vacuum chamber 13. The vacuum in the chamber will suck growth medium 4' through the fill tube 3' and arrange it inside the web cylinder 1', which in this manner is ready to be cut into plant receptacle sizes. By varying the speed with which the cylinder 1' advances and/or the level of under-pressure inside the vacuum chamber the speed and compactness of the growth medium may be controlled.

Figure 5:
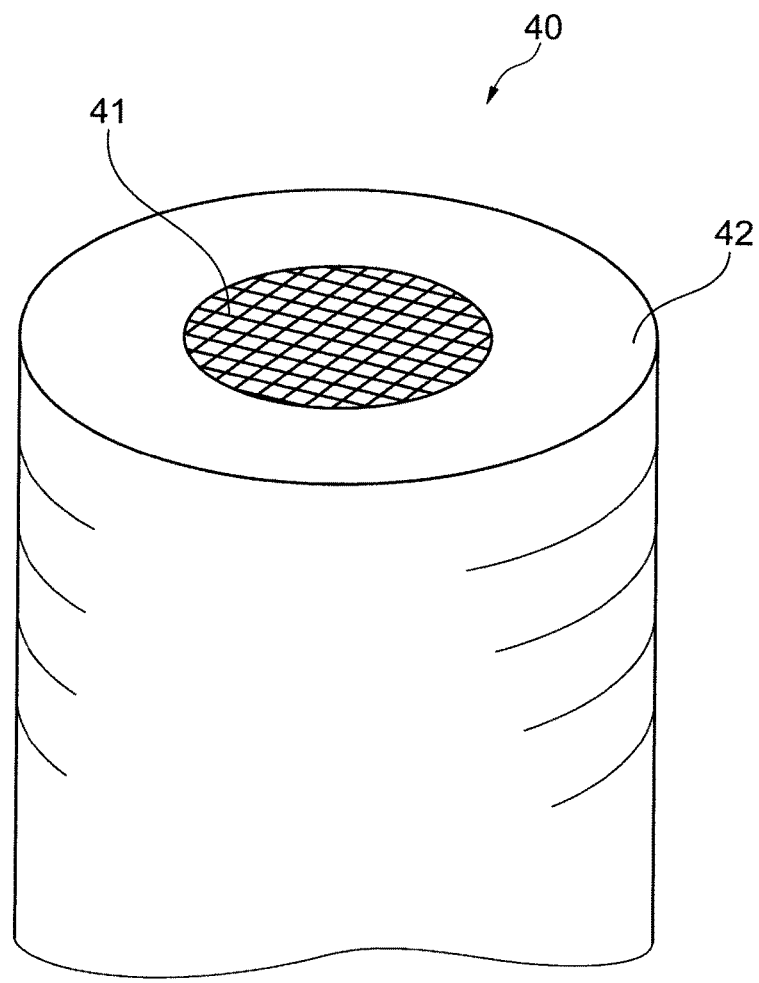
FIG. 5 illustrates a cross-section through a preferred thread used for the manufacture of fibres.

FIG. 5 illustrates a cross-section through a preferred thread 40 used for the manufacture of fibres, which in turn are used for making the sheet material.

Typically the tread 40 from which the web is manufactured with good results has a thickness out of the extruder of approx. 0.6 mm, and after elongation (part of the manufacturing process) the thickness is reduced to approx. 0.2 mm providing a dtex of from 1 to 5. "dtex" is the unit for linear density of a continuous filament or yarn, equal to $\frac{1}{10}$th of a "tex" or $\frac{9}{10}^{th}$ of a denier, i.e. very fine treads.

The core material 41 is typically a PLA polymer tread (polylactic acid based polymer) which has thermoplastic properties, thus making it suitable for extrusion processes. The core 41 is covered with a cover layer 42. This cover layer 42 is a flexible aliphatic polyester. The cover layer 42 is co-extruded in a so-called BICO process (bi-component). Further, the material for the cover layer is modified by adding 10 wt % to 90 wt % organic material, typically bamboo or the like (see discussion above). The addition of organic material does not reduce the weldable properties of the finished tread 40 to such a degree that it is not possible to make a sheet material suitable for the invention. On the other hand the lack of complete weldability or fusion provides a material sheet having a very good integrity, and at the same time an open mesh structure allowing oxygen and water to travel through the sheet (without transport of soil or nutrients). Furthermore, bamboo is known to work as a fungicide, and therefore natural protection of the plant saplings placed in the finished plant receptacles is provided. Also the addition of organic material further improves the biogradability of the material sheet. A weldable biodegradable thread is in this manner achieved and used for the sheet material.

The invention claimed is:

1. A plant receptacle comprising:
   a wall made from a biodegradable permeable sheet material, said biodegradable permeable sheet material is made from a polylactic acid (PLA) thread covered by a layer of a flexible aliphatic polyester comprising between 10 to 30 wt % organic material;
   wherein the biodegradable permeable sheet material has a thickness corresponding to between 10-50 grams per square meter, and has a tension strength including:
   (a) a tension strength to withstand a tension force applied in a longitudinal direction of the biodegradable permeable sheet material from 35-55 N with a maximum elongation of 2-10%, and
   (b) a tension strength to withstand a tension force applied in a transverse direction of 10-30 N, with an elongation between 2 and 15%.

2. The plant receptacle according to claim 1, wherein the biodegradable permeable sheet material is a non-woven or a spun-woven weldable material in sheet form, said sheet form having two opposing longitudinal side edges, and the plant receptacle being formed by welding the two opposing side edges of the sheet together creating a cylinder.

3. The plant receptacle according to claim 1, wherein the biodegradable permeable sheet material has a weight per square meter in the interval between 10 gr/m2 to 50 gr/m2.

4. The plant receptacle according to claim 1, wherein the receptacle has a conical form.

5. The plant receptacle according to claim 1, wherein the plant receptacle is provided with a bottom, or where a cross-weld is provided creating a bottom limitation.

6. The plant receptacle according to claim 1 wherein the organic material is derived from and selected between or is a mixture of bamboo, soya, coconut, flax or banana.

7. A plant receptacle comprising:
   a wall made from a biodegradable permeable sheet material, said biodegradable permeable sheet material being made from a mix of fibres containing a first type of fiber in an amount from 25% to 75% of a monofilament polylactic acid (PLA) based fibre and a second type of fibre in an amount from 25% to 75% of a fibre made from a PLA thread covered with a flexible aliphatic polyester, said flexible aliphatic polyester comprising 10 wt % to 90 wt % organic material, such that the flexible aliphatic polyester covers the PLA thread, thereby creating a weldable biodegradable thread, said first and second types of fibres adding up to 100% of the mix.

* * * * *